United States Patent [19]

Faraoni et al.

[11] Patent Number: 5,401,531
[45] Date of Patent: Mar. 28, 1995

[54] COATING SYSTEM

[75] Inventors: Alessandro Faraoni; Massimo Lombardi, both of Florence, Italy

[73] Assignee: AXIS USA, Inc., Tampa, Fla.

[21] Appl. No.: 922,999

[22] Filed: Jul. 30, 1992

[51] Int. Cl.⁶ .............................. B05D 7/14; B05C 9/12
[52] U.S. Cl. ........................................ 427/12.7; 118/58;
118/686; 118/687; 29/598; 198/799; 427/104;
427/388.1
[58] Field of Search .................. 29/596, 598; 198/341,
198/854, 779, 794, 799, 812; 118/634, 668, 676,
686, 687, 695, 707, 58; 427/104, 116, 444, 127,
287, 240, 318, 388.1

[56] References Cited

U.S. PATENT DOCUMENTS

| | | | |
|---|---|---|---|
| 798,365 | 8/1905 | Rurley | 427/104 |
| 2,932,376 | 4/1960 | Millington | 198/812 |
| 2,933,176 | 4/1960 | Mansson | 198/799 |
| 3,812,947 | 5/1974 | Nygard | 198/341 |
| 3,921,574 | 11/1975 | English | 427/104 |
| 4,142,626 | 3/1979 | Bradley | 198/812 |
| 4,168,776 | 9/1979 | Hoeber | 198/812 |
| 4,485,126 | 11/1984 | Gaietto et al. | 427/116 |
| 4,815,673 | 3/1989 | Wheeler | 29/598 |
| 4,884,674 | 12/1989 | Head | 198/341 |
| 5,179,910 | 1/1993 | Habsburg-Lothringen | 118/634 |

FOREIGN PATENT DOCUMENTS

| | | |
|---|---|---|
| 0489962 | 6/1992 | European Pat. Off. . |
| 1756268 | 4/1970 | Germany . |
| 9106384 | 8/1991 | Germany . |
| 678715 | 10/1991 | Switzerland . |

Primary Examiner—Joseph W. Drodge
Attorney, Agent, or Firm—Fish & Neave

[57] ABSTRACT

A system for processing components which are to be transferred to second system. Portions of the system are selectively controlled so that when demand from the second system is stopped, processing of the components is allowed to be completed as needed. The system includes a preparation station which is stopped once demand is stopped, a processing station which continues to process components until such process can be safely stopped without producing unusable finished products, and a waiting station which is stopped once demand is stopped. The capacity of the waiting station is adjustable in order to accommodate components which must be passed out of the processing station so that other components may be passed through the processing station to complete all uninterruptable processes.

41 Claims, 6 Drawing Sheets

COATING SYSTEM

BACKGROUND OF THE INVENTION

The present invention relates to a processing system which reduces the number of poor quality workpieces resulting when the downstream production line to which the workpieces are delivered ceases demanding workpieces and movement of the workpieces through the processing system is accordingly temporarily stopped. More particularly, the present invention relates to a processing system having a multiple conveyor system for transporting workpieces through the system, in which processes already in progress are substantially completed even though portions of the conveyor system are stopped. The present invention is particularly suitable in systems for performing progressive processes—i.e., processes that proceed incrementally and thus should not be interrupted if completion is desired—including systems for coating coils or slots of components having a magnetic core, such as trickle impregnation systems. Such components include armatures and stators which are used in such electrical devices as motors and alternators.

Previously known trickle impregnation systems apply polymerized resins to wound coils of workpieces in order to bond together the wires. A protective coating of resin is also formed on the coil in order to protect against abrasion of the insulation coating present on the wires. The trickle impregnation system described herein or any other coil coating technique is particularly suited for treating components having a magnetic core such as wound armature coils or wound stator coils ("components").

Trickle impregnation is typically a four step process. First, the components are heated to a temperature which increases the viscosity of the impregnating resin when it comes into contact with the heated coil wire.

During the second step, which is the trickling operation, the components are exposed to trickle dispensers which drop liquid resin onto the heated coils so that the resin can run over the surface of the wires and also into the gaps between the wires. The impregnating operation should produce a component having wires completely coated by resin with the gaps between the wires totally filled, guaranteeing strong bonding.

After impregnation, the components are passed into a curing oven for a third processing step where the components remain for a predetermined time at a high temperature to harden the resin so that it reaches the required bonding and anti-abrasion characteristics. The hardened coating on the wire insulation satisfies the anti-abrasion requirement by preventing exposure to the abrasive atmosphere present in the final motor application.

In the final step, the components are exposed to a forced air flow which by convection cools the components in a required and sufficiently short time.

Typically, the components are transferred from one processing station to another by conveyors. After the impregnation process is completed, the components are transferred to a main production line conveyor in order to complete processing of the components prior to assembling them in the final motor. The conveyors of the processing stations are typically synchronized according to the intermittent demand schedule of the downstream main production line.

Satisfactory impregnation is typically guaranteed only when the entire system is functioning at regime conditions of the general production line. The above-described system presents a disadvantage when the downstream production line ceases demanding components, thereby stopping the conveyors during the impregnation process. Accordingly, components which are present and being treated in the trickle station can no longer advance for further resin application. If such stationary conditions last for more than a certain period of time, the partial amounts of resin which have been deposited on components in the trickle station begin to harden irreversibly. Any attempts to complete these components by adding further resin, which would otherwise cause the previously deposited resin to flow correctly to fill the gaps between the wires, usually are not successful after such irreversible hardening has begun. These components will be defective and are usually a total loss without the possibility of recovery.

SUMMARY OF THE INVENTION

It is therefore an object of this invention to provide a processing system which is generally synchronized with the demand schedule of a downstream production line, yet does not allow for stopped demand to interfere with any process already in progress.

Another object of this invention is to provide a conveyor system having a section which may be halted while other sections can continue transporting objects.

It is yet another object of this invention to provide a system which allows for continued processing and transport of components even though the components are not removed from the system.

It is a further object of this invention to provide a conveyor system in a processing system which has an adjustable section for receiving completed components before the components are removed from the system.

These and other objects of the invention are accomplished in accordance with the principles of this invention by providing a system which is synchronized with production line demand and sequentially stopped at selected locations when there is no production demand. The process being performed on the components may thus be completed for each component so that defective components do not result from an incomplete or halted process. The capacity of the waiting area for the completed components is adjustable to accommodate the accumulation of completed components which are not removed from the system because of stopped production demand.

BRIEF DESCRIPTION OF THE DRAWINGS

Further features of the invention, its nature, and various advantages will be more apparent from the following detailed description of the preferred embodiments and the accompanying drawings wherein like reference characters represent like elements throughout, and in which.

DETAILED DESCRIPTION OF THE INVENTION

Figure 1:
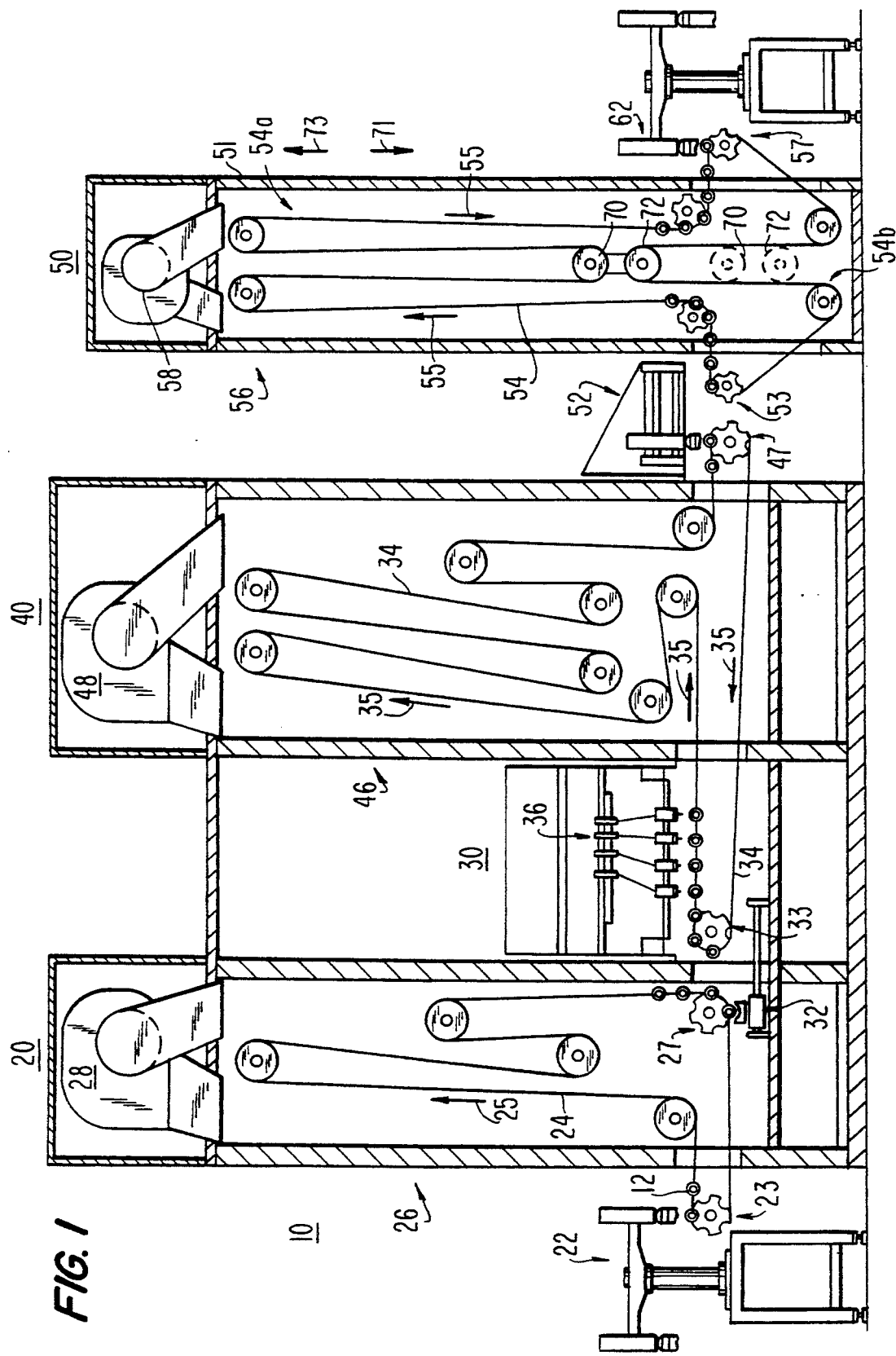
FIG. 1 is a schematic representation of a trickle impregnation system to which the principles of this invention may be applied.

An illustrative trickle impregnation system 10 to which the principles of this invention may be applied is shown in FIG. 1. System 10 for applying resin to the wound coils of armatures, stators, or the like (hereinafter "components 12") includes heating station 20, trickle station 30, curing station 40, and cooling station 50. Components 12 are conveyed through the stations by conveyors 24, 34, and 54 and transferred to, between, and from the stations by transferring devices 22, 32, 52, and 62. Each conveyor is preferably a chain type conveyor having two spaced apart chains 532a and 532b (see FIGS. 2, 3 and 4) with opposed supports 542a and 542b for carrying the components. The supports are fixed to the chains at regular distances from each other. Movements of conveyors 24, 34, and 54 together with operation of their respective transfer devices 22, 32, and 52 are all synchronized to advance or supply one component at a time according to the intermittent demand schedule of a downstream production line supplied by transfer device 62.

At heating station 20, components 12 are loaded one at a time by loading device 22 onto loading point 23 of continuous conveyor 24. Although system 10 is designed for coating wound coils of wire, system 10 may also be used to process any other object which requires a coating. Conveyor 24 carries components 12 in direction 25 through pre-heating oven 26. Heating of components 12 in oven 26 is preferably accomplished by convection using air flows at required high temperatures produced by blowers 28 and conventional heat exchangers. Temperature sensors maintain a constant temperature within oven 26, so that components 12 will not be damaged in case of a production halt during which components 12 may remain in oven 26 for longer than usual. After exiting oven 26, components 12 are transferred at unloading point 27 by unloading device 32 which transfers components 12 to trickle station 30. Continuous conveyor 24 moves at an intermittent rate to supply one component at a time to trickle station 30.

Device 32 loads components 12 onto loading point 33 of continuous conveyor 34 in trickle station 30. Conveyor 34 carries components 12 in direction 35 under a plurality of successively disposed overhead dispensers 36 which drop liquid resin onto the coils to be impregnated. Preferably pressure sensors are provided to control dispenser 36 so that resin is only dispensed when components 12 are below dispenser 36. The entire amount of resin to be applied to a component 12 is accomplished by presenting component 12, through movement of conveyor 34, to a certain number of dispensers 36 so that predetermined amounts of resin are applied successively and intermittently. This method of applying resin is required to give each amount of dropped resin sufficient time to reach a required viscosity on heated components 12 and to allow the resin to penetrate through the gaps between the wires of the coils before a further amount of resin is applied. Air present in the gaps between the coils is therefore expelled, which is important in order to avoid the unwanted formation of bubbles in the impregnated coil. Additional sensors may be present to determine if resin is being applied properly.

During the trickle operation, symmetrically configured coils (e.g., those of an armature) are presented to resin dispensers 36 by rotating component 12 around its longitudinal axis, which is preferably disposed horizontally during transport. This allows for uniform distribution of the resin over the various coils and also counteracts the effect of gravity which may cause resin to flow in certain directions over other directions. For coils like those of stators, trickle dispensers 36 may instead move in relation to component 12 to distribute the resin uniformly.

The same trickle conveyor 34 of trickle station 30 conveys components 12 through curing station 40. In curing oven 46, supplied by blowers 48, the resin on components 12 becomes hardened in order to reach the required bonding and anti-abrasion characteristics. Like conveyor 24, continuous conveyor 34 moves at an intermittent rate to supply one component at a time to the next station. After being cured, components 12 are transferred one at a time at unloading point 47 by unloading device 52 to cooling station 50.

Components 12 are received by conveyor 54 of cooling station 50 at loading point 53. Conveyor 54 carries components 12 in direction 55 through cooling chamber 56 supplied by blowers 58, for a required period of time. The cooling operation is required to bring components 12 to room temperature in a sufficiently short amount of time so that components 12 are cool enough to be transferred to the production line in accordance with production demand. Components 12 are transferred at unloading point 57 from system 10 to the production line conveyor in order to complete processing prior to assembling components 12 in the final motor.

In accordance with the principles of this invention, when production line demands are halted and components 12 are no longer required from system 10, conveyors 24, 34, and 54 are sequentially stopped in order to allow impregnation treatments already in progress to be completed. Initially, when components 12 are no longer removed at unloading point 57 by transferring device 62, the drives of conveyor 24 and transferring devices 22 and 32 are signaled to stop. Thus, supply of components 12 from pre-heating station 20 to trickle station 30 is terminated. However, as discussed above, completion of resin impregnation treatment is crucial to prevent formation of defective components 12 because of a delay in production. Thus, conveyors 34 and 54 continue to move components 12 so that treatment begun in trickle station 30 may be completed. If demand resumes shortly, system 10 resumes normal functioning. If the demand halt lasts longer, after all components 12 which have begun to be treated in trickle station 30 have entered curing station 40, the remaining portion of system 10 halts until demand resumes. The individual steps involved in this interruption of system 10 are described in more detail below.

Because processing continues while components 12 are not removed from system 10, completed components 12 accumulate in cooling station 50. The arrangement of conveyor 54 is adjustable in order to provide cooling station 50 with the capacity to continue to receive components 12 from oven 46 while there is no discharge to the downstream production line. The amount of conveyor 54 positioned in receiving portion 54a (extending from loading point 53 to unloading point 57) is therefore capable of being adjusted to allow for all components in trickling station 30 at the time demand stops to be treated in curing oven 46. The amount of conveyor 54 through portion 54a is increased to correspond to the number of components present in trickle station 30 which must enter oven 46 during the time demand has ceased. At the same time, the amount of conveyor 54 in return portion 54b (extending from unloading point 57 to unloading point 53) needs to be reciprocally adjusted. This adjustment is accomplished by moving loops 70, 72 of the two conveyor portions through the same distance at the same time. Loops 70, 72 are moved a predetermined distance in direction 71 to increase the length of the receiving portion and in direction 73 to decrease the length of the receiving portion, as will be more fully described below.

When production demands are halted, system 10 sequentially stops as follows. As discussed above, preheating station 20 is the first portion of system 10 to stop transporting components 12. Conveyor 34 continues to move components 12 through trickle station 30 and curing station 40 at the same regime rates so that the trickle process is not interrupted and all components 12 exiting system 10 will be properly treated and cured. The number N1 of components 12 entering curing oven 46 (equivalent to the number of times conveyor 34 is incremented) is counted until all components 12 already in trickle station 30 enter oven 46, or until production demand resumes, whichever occurs first. If production demand has stopped for a sufficiently long period of time, number N1 will eventually equal the capacity of trickle station 30, indicating that all components 12 on conveyor 34 in trickle station 30 have entered curing oven 46. After the last of these components enters oven 46, conveyor 34 stops advancing until the production line starts to demand components again at unloading point 57. Number N1 is recorded or stored for later use. If, however, production demand does not stop long enough for all components 12 in trickle station 30 to enter curing oven 46 before demand resumes, then system 10 will resume normal functioning, counting is stopped, and number N1 already counted is recorded or stored for later use.

Meanwhile, in cooling station 50 conveyor 54 is halted at unloading point 57 because transfer device 62 is no longer transferring components 12 to the production line. However, in order to successfully complete treatment of all components in system 10, components 12 from trickle station 30 must be transferred to curing oven 46 to be cured. Accordingly, cured components 12 must be removed from curing station 40 and transferred to cooling station 50 (effectively a waiting station) in order to allow freshly trickled components to enter for curing. Thus, transferring device 52 continues to transfer components 12 to cooling station 50, and conveyor 54 continues to advance at loading point 53 to pick up cured components 12. Continued movement of conveyor 54 at point 53 pulls loops 70, 72 in direction 71 to redistribute conveyor 54 between portions 54a and 54b to accommodate for the increase in completed components which cannot yet be removed from system 10. Once the last of the components in trickle station 30 at the time demand ceased has been treated by dispensers 36 and has entered oven 46, if the production line is still at a standstill, conveyors 34 and 54 stop advancing. Of course, if demand resumes earlier, conveyor 54 resumes moving past point 57 and redistribution to increase capacity of portion 54a ceases.

Figure 5:
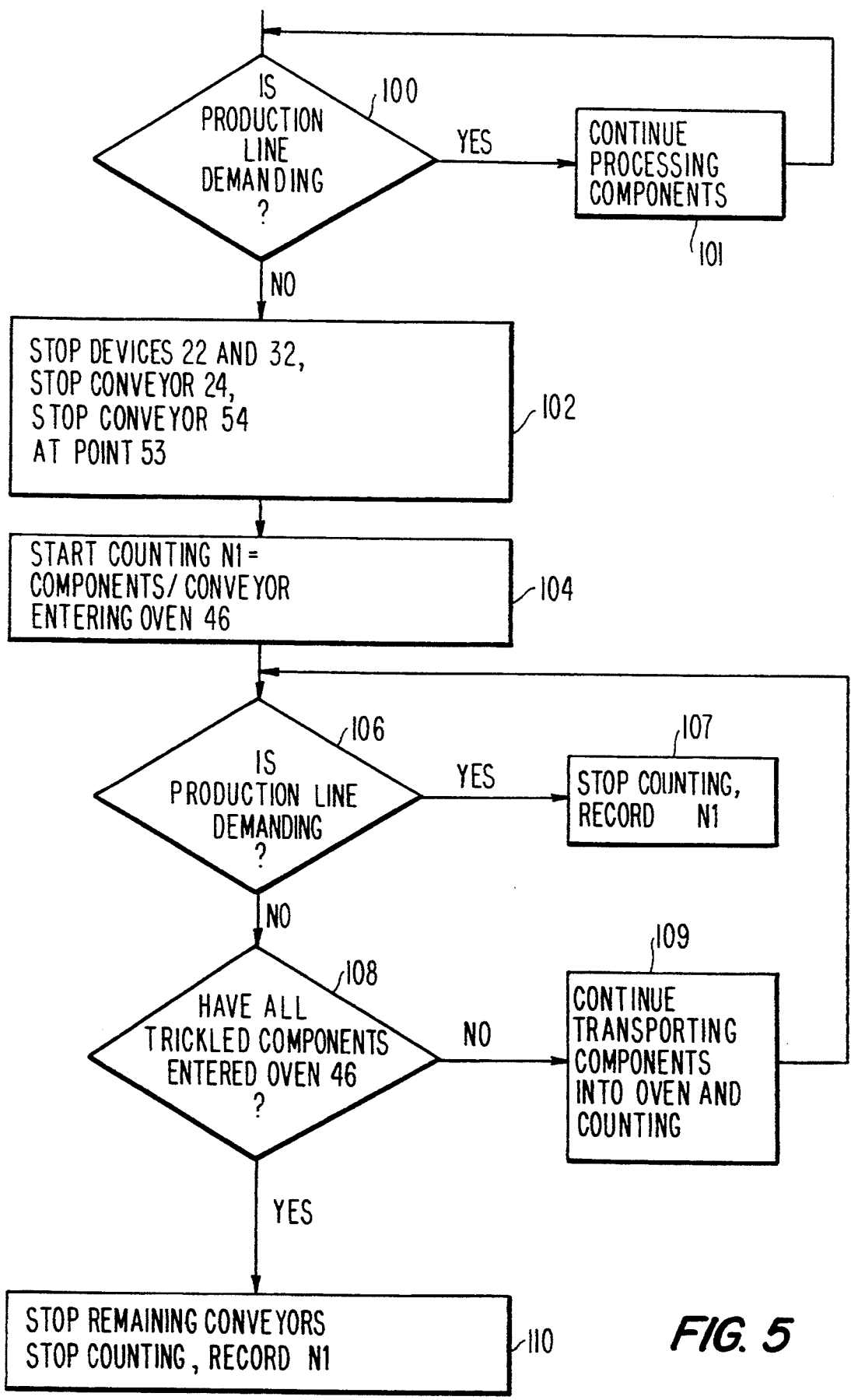
FIG. 5 is a flow chart of a method of sequentially controlling a conveyor system in a processing system accordance with the principles of this invention.

A flow chart illustrating the steps of this method is presented in FIG. 5. At test 100, the status of production line demand is determined. Processing is continued at step 101 if the production line is still demanding components. If demand has stopped, then at step 102 device 22 is stopped from feeding components 12 to conveyor 24, conveyor 24 is stopped, device 32 is stopped from feeding components 12 to conveyor 34, and conveyor 54 is stopped at point 57. Thus, new components will not enter station 30, and only components 12 currently in trickle station 30 will continue to be processed. Next, the number N1 of components 12 entering trickle oven 46 (equivalent to the number of times conveyor 34 is incremented) is counted in step 104. The status of production line demand is again determined at test 106. If demand has resumed, then at step 107 counting is stopped and number N1 is recorded or stored. System 10 then resumes normal regime rates. If demand is still halted, then at test 108, the system determines whether all components 12 which were in trickle station 30 at the time production demand stopped have entered oven 46. If not, in step 109 components continue to be transported and counted, and test 106 is repeated. Alternatively, if all components have entered curing station 40, in step 110, remaining conveyors 34 and 54 are stopped, the count of step 104 is stopped, and number N1 is recorded or stored for later use.

When the production line resumes demanding components, heating station 20 is signaled to resume discharge to trickling station 30 and all the conveyors resume advancing according to the rate at which components are being requested at unloading point 57. Once the system has restarted, a length of conveyor 34 not carrying components 12 will advance to unloading point 47. This portion corresponds to the portion of conveyor 34 passing loading point 33 during the period in which the production line ceased requesting components. This length includes the portion of conveyor 34 which passes loading point 33 after supply from oven 26 has been terminated until components 12 already in trickle station 30 have been passed through curing oven 46 (at which point conveyor 34 stops moving) or until production demand resumes. When this portion of conveyor 34 without components reaches unloading point 47 and transfer device 52, conveyor 54 stops advancing at loading point 53 (therefore components are not transferred), while conveyor 54 continues to advance at unloading point 57 (by pulling loops 70, 72 in direction 73 as discussed below) in order to discharge components 12 to the production line. Thus, the distribution of conveyor 54 through receiving portion 54a and 54b is adjusted to return the capacity of cooling station 50 to normal operating conditions. Meanwhile, conveyor 34 continues to advance at the same rate so that the empty portion moves totally beyond unloading point 47 and transfer device 52. Once the empty portion of conveyor 34 has passed point 47, conveyor 54 may continue moving at point 53.

Figure 6A:
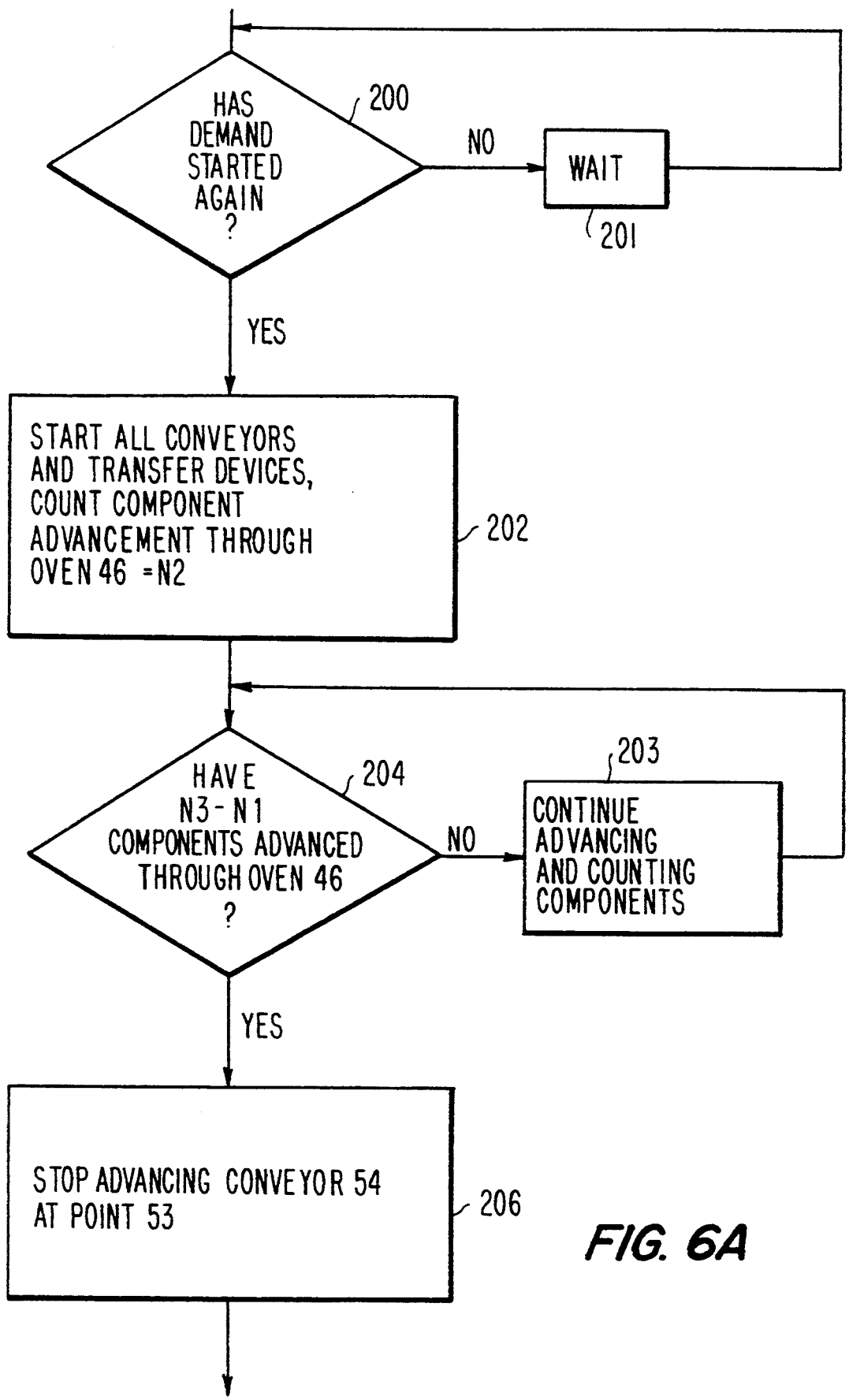
FIGS. 6a and 6b (collectively "FIG. 6") are flow charts of a method of restarting a stopped conveyor system in a processing system, readjusting the capacity of the waiting area in accordance with the principles of this invention, and resuming normal operating conditions.
Figure 6B:
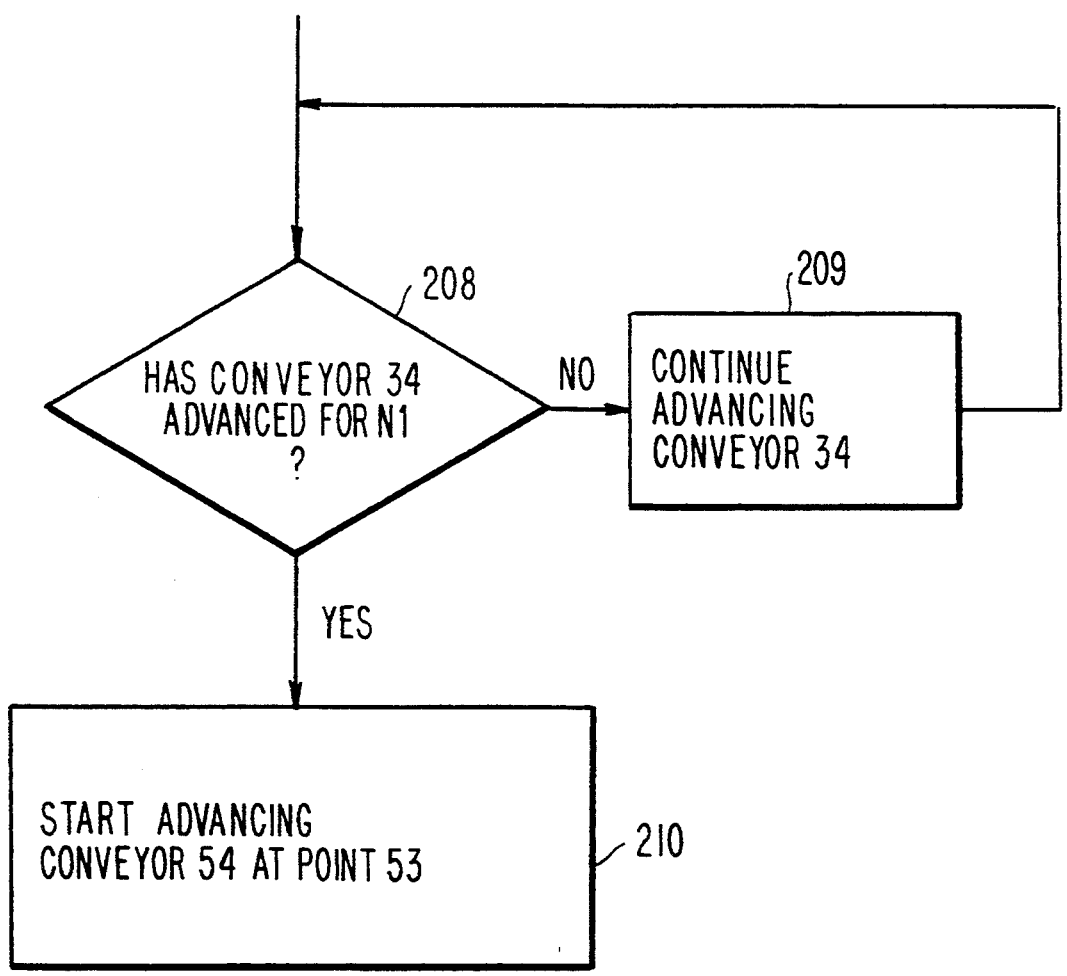

A flow chart illustrating the steps of the preferred method for returning system 10 to normal operating conditions is presented in FIG. 6. At test 200, the status of production line demand is determined. The system continues to wait, in step 201, if demand has not restarted. If demand has restarted, then at step 202 conveyors 24, 34, and 54, and transfer devices 22, 32, and 52 are restarted. The number N2 of components 12 advancing through curing oven 46 (equivalent to the number of times conveyor 34 is incremented) is also counted in this step. Next, at test 204, the system determines whether the empty portion of conveyor 34 has reached transfer device 52 by comparing number N2 with the difference between N3 (the capacity N3 of curing oven 46) and N1 (the number of components which entered curing station 40 after demand ceased and before demand resumed). In step 205, if N3−N1 components 12 have not passed through oven 46 (i.e., N2≠N3−N1), the components (or conveyor) continue to advance and be counted. Once N3−N1 components 12 have passed (i.e., N2=N3−N1), then at test 204 the empty portion of conveyor 34 has reached transfer device 52 and, in step 206, conveyor 54 is stopped at point 53. Conveyor 34 continues to advance. Conveyor 54 also continues to advance at point 57, thereby pulling loops 70, 72 in direction 73 to allow conveyor 54 to resume its original distribution between portions 54a and 54b. At test 208, the system determines whether the empty portion of conveyor 34 has passed transfer point 47. Conveyor 34 continues to advance in step 209 until the empty portion has passed. Once conveyor 34 has advanced for N1 increments, the empty portion has passed, and, in step 210, conveyor 54 may resume advancement at point 53. System 10 then resumes normal operation.

Figure 2:
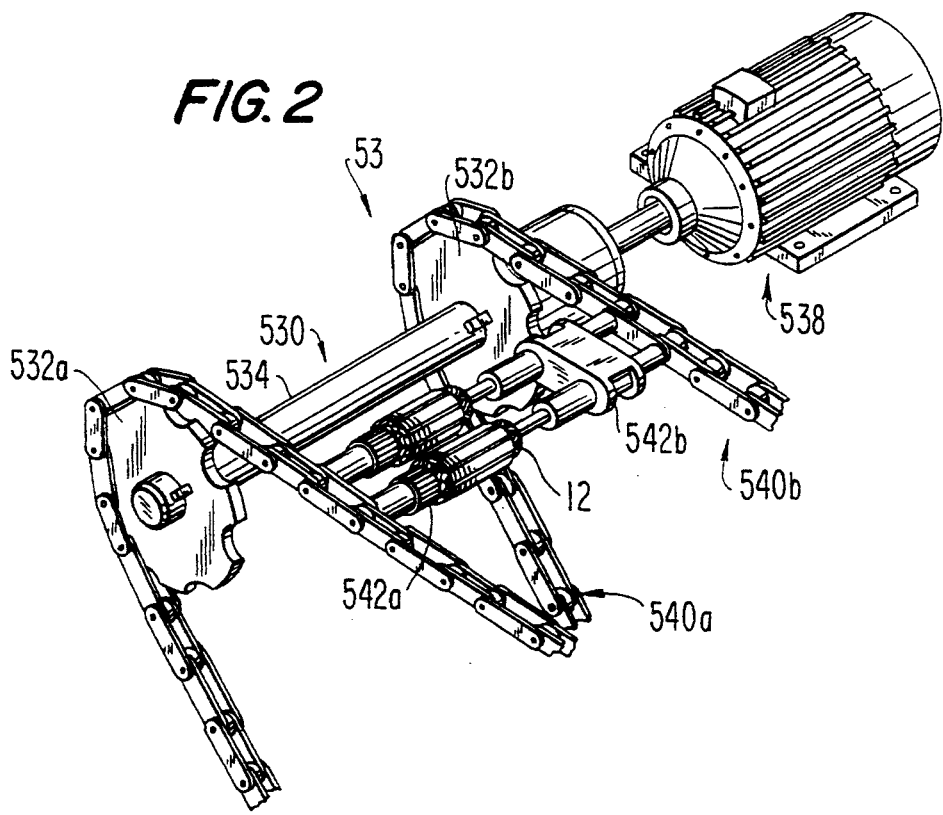
FIG. 2 is an isometric view of the pulley and related motor for driving the portion of the conveyor leading to the cooling chamber of the impregnation system of FIG. 1.
Figure 3:
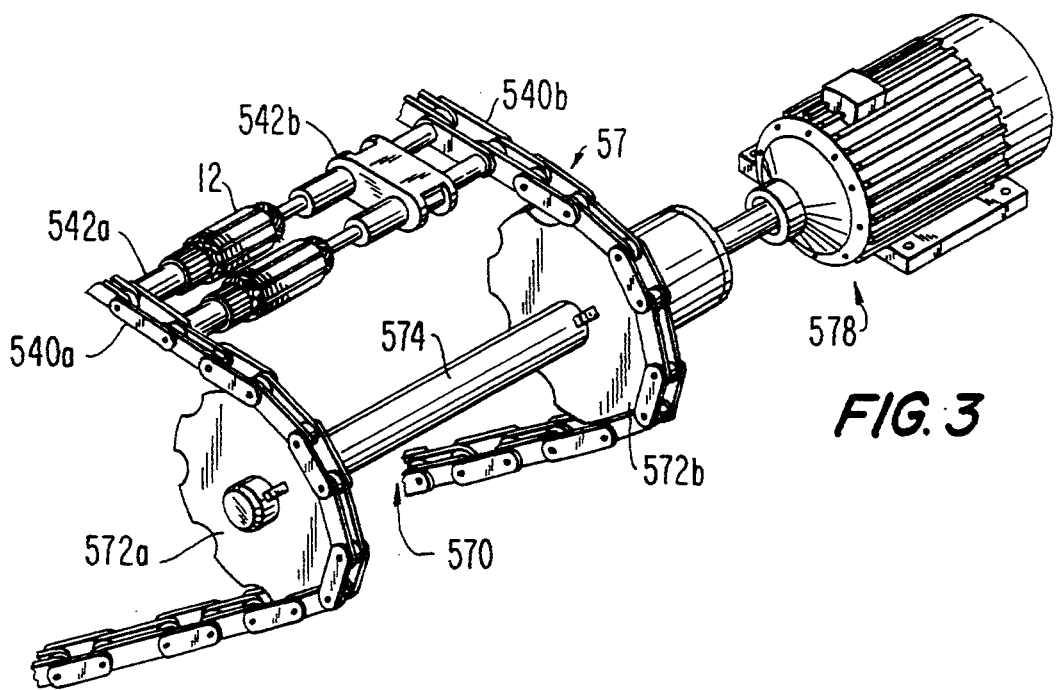
FIG. 3 is an isometric view of the pulley and related motor for driving the conveyor after leaving the cooling chamber of the impregnation system of FIG. 1.

Means for operating the conveyors, particularly conveyor 54 at points 53 and 57, are shown in more detail in FIGS. 2 and 3, respectively. As shown in these FIGURES, conveyor 54 preferably includes two parallel chains 540a and 540b moved by pulleys. Opposite supports 542a and 542b, spaced apart along chains 540a and 540b, carry components 12. At point 53, motor 538 drives pulley 530, including wheels 532a and 532b and axle 534, to move conveyor 54. Similarly, at point 57, motor 578 drives pulley 570, including wheels 572a and 572b and axle 574, to move conveyor 54. Movement at either point can be stopped by means of brake equipment (not shown). These operations can be commanded by signals from the system's controls.

Figure 4:
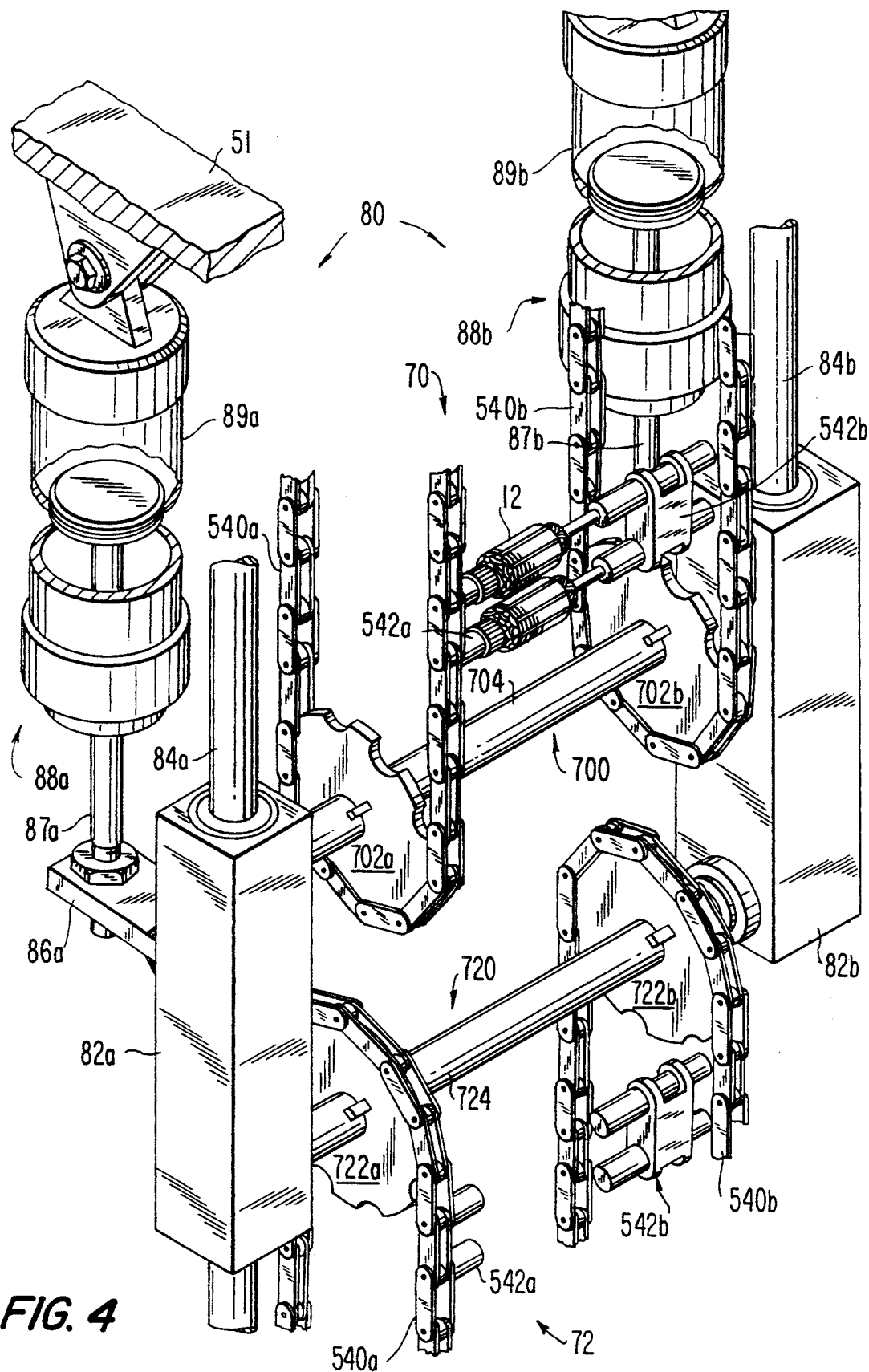
FIG. 4 is an isometric view of the pulley wheels and conveyor loops for effecting variable conveyor lengths in the impregnation system of FIG. 1 for receiving completed components before transfer to the downstream production line.

Means 80 for adjusting the length of receiving portion 54a and return portion 54b of conveyor 54 is shown in detail in FIG. 4. Pulley 700 for chain loop 70 includes wheels 702a and 702b which carry chains 540a and 540b, respectively. Similarly, pulley 720 for chain loop 72 includes wheels 722a and 722b which carry chains 540a and 540b, respectively. Wheels 702a and 702b are fixed on axle 704, and wheels 722a and 722b are fixed on axle 724. Axles 704 and 724 are supported on common support members 82a and 82b which are capable of moving on respective upstanding guide bars 84a and 84b fixed to frame structure 51 of cooling chamber 56. Appendixes 86a and 86b of support members 82a and 82b are connected to rods 87a and 87b of pistons 88a and 88b, respectively. Cylinders 89a and 89b, respectively of pistons 88a and 88b, are connected to frame structure 51 of cooling chamber 56. The top chamber of each of cylinders 89a and 89b is always maintained in pressure so that conveyor 54 remains in tension.

Adjustment of the distribution of conveyor 54 is accomplished as follows. When downstream production line demand is halted, motor 578 is braked to stop point 57 of conveyor 54. Meanwhile, motor 538 continues to advance conveyor 54 at point 53 so that components 12 can be removed from curing station 40 to allow components 12 in trickle station 30 to enter. Motor 538 also causes conveyor 54 to exert tension on loops 70, 72, to move in direction 71 to increase the amount of conveyor 54 in receiving portion 54a. In particular, for each rotation of pulley 530 to receive a component from the oven, support members 82a and 82b move in direction 71 to allow lengthening of receiving portion 54a of conveyor 54. Support members 82a and 82b will move in direction 71, as described, for a distance corresponding to the length of conveyor 54 required for receiving components which must exit curing station 40 so that components 12 in trickle station 30 may be transferred into oven 46 for curing.

When downstream production line demand resumes, motor 578 resumes moving conveyor 54 at point 57 to allow discharge of components 12 to the production line. As described above, during the period in which conveyor 34 passes transfer device 52 without presenting components 12 for transfer, pulley 530 at point 53 stops advancing conveyor 54. Motor 578, which continues to move at least a portion of conveyor 54, causes conveyor 54 to exert tension on loops 70, 72 to thereby move the loops in direction 73 and shorten the length of receiving portion 54a of conveyor 54 to its original length.

In a further embodiment, the principles illustrated for varying the capacity of conveyor 54 of cooling chamber 50 may be applied to conveyor 34 of curing station 40 for receiving components 12 after they have been impregnated. However, a solution of this type requires mounting and functioning of an assembly as shown in FIG. 4 in a high temperature ambient which may present a less reliable result.

It will be appreciated that the principles of this invention are also applicable to systems comprising obvious modifications to the system shown in FIG. 1. For example, although the present invention is described in relation to an impregnation system including a curing station, the principles of the invention may also be applied to systems utilizing rapidly hardening resins. Although such rapidly hardening resins do not require curing after application, such systems generally require storing capabilities after impregnation and before discharge to the production line. Accordingly, the principles of the present invention may be applied to the portion of the system between the impregnation station and the downstream production line.

It will be understood that the present invention may be applied to any system which interacts with a production line and which must convey articles to various processing stations without being stopped between stations. For example, the principles of this invention may be used in systems for applying powderized coatings to workpieces by electrostatic attraction, such as described in, commonly-assigned United States patent application Ser. No. 07/661,830, filed Feb. 27, 1991, now U.S. Pat. No. 5,179,910, which is hereby incorporated by reference in its entirety.

It will be understood that the foregoing is merely illustrative of the principles of the invention, and that various modifications can be made by those skilled in the art without departing from the scope and spirit of the invention. The described embodiments are presented for the purpose of illustration rather than limitation, and the present invention is limited only by the claims which follow.

What is claimed is:

1. A system for processing and coating portions of components each having a magnetic core before transferring said components to an other processing system, said processing and coating system comprising:
a plurality of stations including a coating station and a final station, wherein interruption of the coating process at said coating station for longer than a period of time results in defective units;
means for transporting said components through said stations, said transporting means having a plurality of separately controllable portions and a plurality of support members designed for carrying components having a magnetic core; and
means for removing said components from said final station and transferring said components to said other processing system according to production demands of said other processing system; and
means for, when said demands from said other processing system are halted for longer than said period of time:
stopping said removing and transferring means,
allowing at least one portion of said transporting means to continue to transport components which have begun to be coated through and out of said coating station, and
separately adjusting the at least one portion of said transporting means that transports said components through said final station to thereby increase the capacity of said final station to accommodate a selected number of said components based on the number of said components determined to be in said coating station at the time said demands from said other processing system are halted and said removing and transferring means are stopped, without changing the capacity of other of said plurality of stations.

2. The system of claim 1 wherein said transporting means and said removing and transferring means are synchronized to supply said components to said other system intermittently according to the production demands of said other system.

3. The system of claim 1 wherein said transporting means comprises a plurality of conveyor means, at least one of said conveyor means being associated with each station of said plurality of stations.

4. The system of claim 3 wherein, when demands from said other system are halted for longer than said predetermined period of time, the conveyor means through said coating station continues to transport components which have begun to be coated until coating of those components is completed, and resumes transporting components when said demands resume.

5. The system of claim 1 wherein said coating station includes means for applying a resin coating on portions of said components.

6. The system of claim 5 wherein said components are armatures and said means for applying a resin coating trickles resin onto the wires of said armatures.

7. The system of claim 5 wherein said components are stators and said means for applying a resin coating trickles resin onto the wires of said stators.

8. The system of claim 1 further including a preliminary station for supplying components to said plurality of stations.

9. The system of claim 8 wherein:
said preliminary station and each of said plurality of stations have one of said separately controllable portions of said transporting means; and
said separately controllable portions of said transporting means interact and are synchronized with each other, and also are individually controlled and stopped.

10. The system of claim 1 wherein:
said coating system comprises a trickle impregnation system for coating portions of said components with resin;
said coating station includes resin dispensers for trickling resin onto said portions of said components;
and said plurality of stations further include a curing station having heating means for heating said components to cure the applied resin, and a waiting station in which cured components are transported before being transferred to said other system.

11. The system of claim 10 wherein said transporting means comprises a conveyor system.

12. The system of claim 11 wherein said means for allowing at least one portion of said transporting means to continue to transport components when demands from said other system are halted further comprises:
means for allowing a portion of said conveyor system to continue to transport said number of components through said coating station to complete coating of said number of components in said coating station; and
means for stopping a portion of said conveyor system that passes through said waiting station to prevent components from moving out of said waiting station.

13. The system of claim 12 wherein the entire conveyor system stops after said components, present in said coating station at the time said demands from said other system are halted, have entered said curing station and said demands are still halted.

14. The system of claim 12 wherein said waiting station is said final station.

15. The system of claim 11 wherein said plurality of stations further include a preheating station having heating means for preparing components for entering said coating station.

16. The system of claim 15 wherein:
said conveyor system comprises a plurality of conveyor means; and
said preheating station has a conveyor means separate from the conveyor system;
wherein when said demands from said other system are halted:
said conveyor means of said preheating station is stopped in order to stop supplying said coating station with components; and
said conveyor system continues to move components from said coating station into said curing station.

17. The system of claim 1 further comprising support members for supporting ends of said components, leaving a central portion of said components between said first and second ends free from support.

18. The system of claim 10 wherein said waiting station further comprises means for cooling said components after said components have been cured in said curing station.

19. An adjustable station in a system for coating portions of components each having a magnetic core, said system having at least said adjustable station and an upstream coating station before said adjustable station, said adjustable station comprising:
 a first point at which said components are received by said adjustable station;
 a second point at which said components are transferred out of said adjustable station;
 continuous conveying means extending between said first and second points and having a plurality of means designed for supporting components having a magnetic core;
 means for controlling movement of said continuous conveying means at said first point based on the number of the components present in said coating station to assure that said components continuously move through and out of said coating station at a rate to produce properly coated components independent of upstream and downstream production demands; and
 means for stopping movement of said continuous conveying means at said second point when the downstream production demands are halted;
 said adjustable station being operable such that transfer of components out of said system is stopped when the downstream production demands have been halted such that:
 said means for stopping stops said continuous conveying means at said second point;
 components present in said coating station continue to move through and out of said coating station; and
 said means for controlling movement of said continuous conveying means continues to move said conveying means so that a selected number of said support means on said continuous conveying means passes said first point, said selected number being based on the number of components determined to be in said coating station at the time transfer out of said system is stopped;
 whereby all components in said coating system can be completely and properly coated without leaving said coating system.

20. The adjustable station of claim 19 wherein said conveying means includes:
 a transporting portion extending from said first point to said second point; and
 a return portion extending from said second point to said first point; wherein:
 said transporting portion carries coated components; and
 said return portion does not carry coated components.

21. The adjustable station of claim 20 wherein distribution of said conveying means between said transporting portion and said return portion of said conveying means is adjustable.

22. The adjustable station of claim 20 further including:
 a first motor for moving said conveyor means at said first point towards said second point;
 a second motor for moving said conveyor means at said second point towards said first point; and
 means for adjusting distribution of said conveying means between said transporting portion and said return portion of said conveying means.

23. The adjustable station of claim 22 wherein:
 said means for adjusting distribution of said conveying means between said transporting and return portions comprises loops of said conveyor means located in said transporting and return portions; and
 said loops are moved along a predetermined path to adjust the distribution of said conveyor means between said transporting portion and said return portion.

24. The adjustable station of claim 22 wherein when transfer out of said system is stopped:
 said second motor stops;
 said first motor continues to move said conveyor means into said transporting portion as long as components continue to exit said coating station; and
 said adjusting means moves to increase the amount of said conveyor means through said transporting portion to accommodate a selected number of components based on the number of components moving out of said coating station when transfer out of said system is stopped.

25. The adjustable station of claim 22 wherein transfer out of said system resumes such that:
 said second motor continues to move said conveyor means return portion;
 said adjusting means moves to return the distribution of said conveyor means between said transporting portion and said return portion to an initial state; and
 said first motor stops during readjustment of said conveyor means.

26. The adjustable station of claim 25, the station being operable such that:
 when transfer out of said system is stopped, transfer of new components into said coating station is stopped after a predetermined time;
 components are received at said first point of said adjustable station from an upstream conveying means having a number of vacant spaces equal to a number of components that would have entered the coating station during the time transfer of components is slopped had transfer of components not been stopped; and
 transfer out of said system resumes, such that said first motor stops while said vacant spaces pass by said first point to thereby return capacity of said adjustable station to its capacity before transfer of components out of said system is stopped.

27. The adjustable station of claim 25, further including means for counting the number of components moving out of said coating station during the time transfer of components out of said system is stopped and controlling stoppage of said first motor during a readjustment of said conveyor means based on said counted number of components.

28. The adjustable station of claim 22 wherein movement of one of said first and second motors while the other of said first and second motors is stopped causes said adjusting means to move.

29. The adjustable station of claim 19 wherein:
 said conveying means comprises a first conveyor chain and a second conveyor chain parallel to and spaced apart from said first conveyor chain;
 said support means comprise first support members spaced apart along said first conveyor chain for supporting a first end of a component and second support members spaced apart along said second conveyor chain for supporting a second end of a component, each second support member positioned opposite a first support member; and said first and second support members are designed to hold ends of said components so that the bodies of said components are free from contact with any support means.

30. A method of processing components, each having a magnetic core, in a coating system, and transferring said components for processing in accordance with an other system, said processing method comprising the steps of:

applying a coating on a portion of each of said components, wherein interruption of application of said coating for longer than a period of time results in defective coating of said portion of said components;

transferring coated components into a final station of said coating system;

transferring said processed components out of said final station for processing by said other system, according to demand of said other system; and when demand from said other system has halted for longer than said period of time, stopping transfer of said components from said final station, continuing to apply a coating to said portion of each of said components already in said coating station without increasing the capacity of at least said coating station, moving coated components out of said coating station, and increasing capacity of said final station to accommodate a selected number of components based on the number of components that are determined to be in said coating station at the time demand is halted so that proper and complete coating of all components in the coating station is achieved.

31. The method of claim 30 further including the step of cooling said components in said final station.

32. The method of claim 30 further including the step of transporting said components, on a conveyor means between stations of said coating system.

33. The method of claim 30 further including, in the coating system, providing for a step of heating said components in a heating station.

34. The method of claim 33 further including the steps of retaining said components in said heating station when transfer of components out of said system is stopped.

35. The method of claim 30 further comprising the step of rotating said components while coating said portion of said components.

36. The method of claim 30 wherein each of said components has a shaft, said method further including the step of conveying said components between said processing stations on a conveyor means which supports each of said components only at ends of said shaft.

37. The method of claim 30, further comprising the steps of:

counting the number of components transferred from said coating station when the demand from said other system has halted;

storing the number of components transferred from said coating station when the demand from said other system has halted; and once the demand from said other system resumes, applying said stored number to return capacity of said final station to its capacity before the demand from said other system halted.

38. A processing system for coating with resin portions of components having a magnetic core, said system comprising:

a resin coating station having means for applying resin to portions of said components and means for rotating said components during coating;

a finishing station for conveying said components from said resin coating station to a downstream system, said resin being cured while being conveyed in said finishing station;

means for placing said components into said system;

means for removing said components from said system; and means for stopping said removing means from removing said components from said system and simultaneously adjusting the capacity of said finishing station without adjusting the capacity of said resin coating station so that said finishing station can accommodate additional components leaving said resin coating station but not leaving said processing system so that said components can be completely and properly coated, wherein the adjustment performed by said means for stopping and adjusting is controlled by the a number of components determined to be in said coating station at the time said means for stopping and adjusting stops said removing means.

39. The system of claim 38 wherein said finishing station comprises a curing station and a waiting station.

40. The system of claim 38 wherein said portions of said components that are coated with resin comprise wound wires.

41. The system of claim 38 wherein said portions of said components that are coated with resin comprise slots.

* * * * *